United States Patent [19]

Fujii et al.

[11] 4,268,280

[45] May 19, 1981

[54] METHOD OF CONTINUOUSLY DEGASSING WATER

[75] Inventors: Shinichi Fujii; Hiroshi Hata, both of Minami-ashigara, Japan

[73] Assignee: Fuji Photo Film Co., Ltd., Minami-ashigara, Japan

[21] Appl. No.: 46,281

[22] Filed: Jun. 7, 1979

[30] Foreign Application Priority Data

Jul. 21, 1978 [JP] Japan ................................ 53-89168

[51] Int. Cl.³ .......................................... B01D 19/00
[52] U.S. Cl. ........................................... 55/54; 55/55; 261/DIG. 10
[58] Field of Search ................. 55/36, 39, 44, 53, 54, 55/55, 196, 198; 261/76, 122, 124, DIG. 76, DIG. 10; 134/22 C, 26, 28, 29

[56] References Cited

U.S. PATENT DOCUMENTS

| 2,455,498 | 12/1948 | Kern | 261/DIG. 10 |
|---|---|---|---|
| 2,622,694 | 12/1952 | Pryor | 55/198 |
| 2,684,231 | 7/1954 | Pomykala | 261/DIG. 10 |
| 2,809,711 | 10/1957 | Allen | 55/198 X |
| 3,926,664 | 12/1975 | Verreydt | 134/22 C |
| 4,160,002 | 7/1979 | Janovtchik | 261/DIG. 76 |

Primary Examiner—Robert H. Spitzer
Attorney, Agent, or Firm—Sughrue, Rothwell, Mion, Zinn and Macpeak

[57] ABSTRACT

A method of continuously degassing water in which the vapor phase components melted in the water are continuously degassed by heating the water and reducing the pressure of the water. An in-line heater is used to continuously mix saturated steam into water supplied continuously, to heat said water and to accelerate the foaming of the vapor phase components melted in the water by cavitation caused by the mixing of said saturated steam. Thereafter the water is degassed automatically while being pooled in a degassing tank under atmospheric pressure.

8 Claims, 3 Drawing Figures

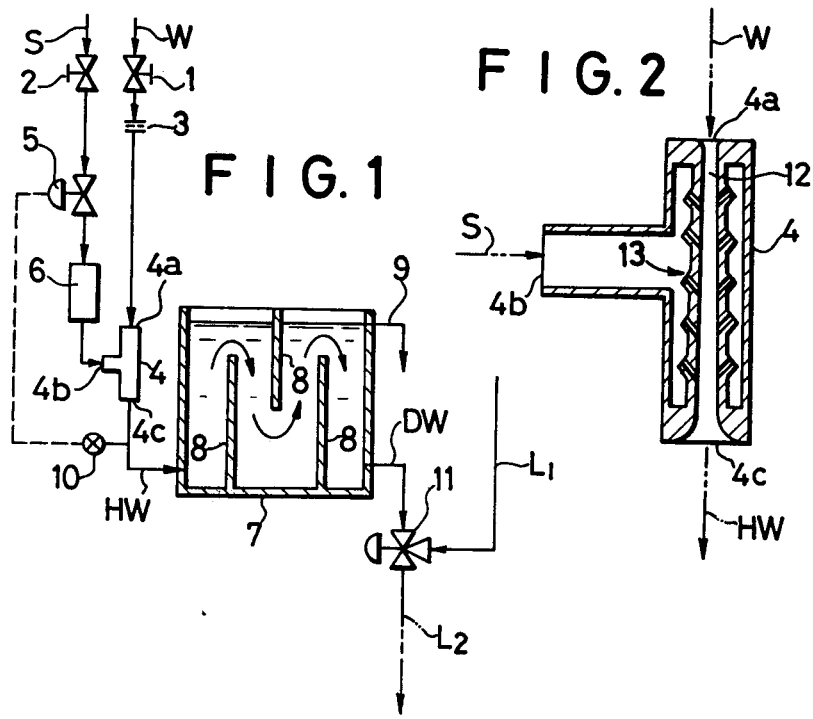
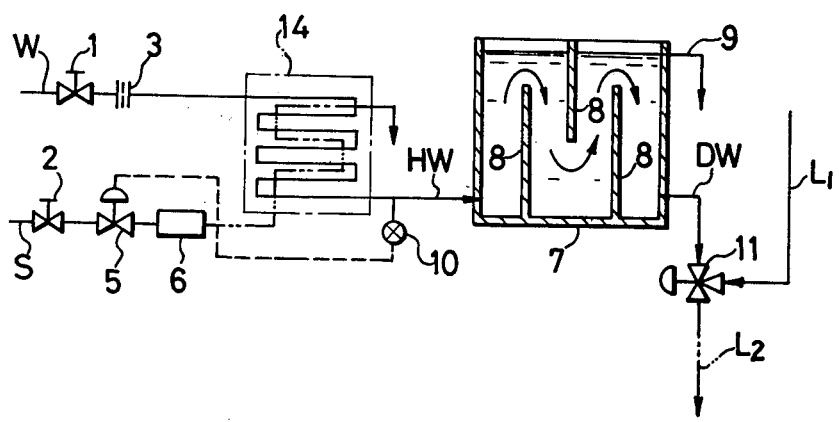
FIG. 3 PRIOR ART

METHOD OF CONTINUOUSLY DEGASSING WATER

BACKGROUND OF THE INVENTION

This invention relates to methods of continuously degassing water, and more particularly to a method of degassing water in which heating energy can be economically used and a large amount of gaseous component can be continuously degassed from water in a relatively short time.

Heretofore, with a coating device, especially with a photographic photo-sensitive material coating device, a problem exists with bubbles of air or other gases included in coating liquid delivering lines, generally conduit pipes, connectors, filters, meters, etc. being stuck on the surface of a material to be coated, together with the coating liquid. This tends to considerably degrade the quality of the surface of the material coated therewith, since a smooth finish cannot be obtained. The trouble is due to the bubbles that occur in a concentrated manner immediately after the start of coating. As a result of an investigation of the cause for and the counter-measures to prevent this trouble, a method as described in the specification of Japanese Patent application Laid-Open No. 65824/1974 has been proposed. In the method, while a coating operation is suspended, the liquid delivering line is filled with a degassed cleaning liquid or water thereby to prevent the entry of a large amount of gas into the liquid delivering line. The degassed cleaning liquid is continuously supplied and discharged to remove the gas which is left in the liquid delivering line and the degassed cleaning liquid is replaced by the coating liquid immediately before the start of the coating operation in such a manner that the former liquid is followed by the latter liquid. This method contributes greatly to the prevention of the occurrence of the above-described trouble.

However, the difficulties encountered due to the bubbles, which are produced immediately after the start of the coating operation, is not completely overcome by the replacement of the cleaning liquid with the coating liquid. Especially, if the cleaning liquid itself is not completely degassed, the effect of the liquid replacement is considerably lessened. Accordingly, an improved method of degassing the cleaning liquid has been the subject of continuing study and development.

The following conventional methods of degassing a cleaning liquid or cleaning water are also available and known within the prior art:

(1) The so-called "heating type degassing method" in which the cleaning liquid or the cleaning water supplied into a heating tank is heated by a heat exchanger such as an electrical heater, a steam coil, or the like to a relatively high temperature, for instance 90° C.–100° C. so that gases melted in the liquid or water can be readily removed.

(2) A pressure reduction type degassing method in which while the pressure of a liquid storing tank is reduced, the liquid or water is allowed to fall like rain to thereby degass it.

(3) An ultrasonic type degassing method in which the liquid or water in a liquid storing tank is vibrated by ultrasonic waves to remove gases melted therein.

These conventional methods have been extensively employed; however; they are still disadvantageous in the following points:

In the heating type degassing method, the liquid or water is substantially heated to its boiling point by utilizing the fact that the solubility of gas in liquid or water changes in inverse proportion to the temperature of the liquid or water. Therefore, it is necessary to use a large amount of heating energy. In the case where the liquid or water should be at a low temperature when used in the practical application, it is necessary to decrease the temperature of the liquid or water to the required value for utilization. This increases manufacturing steps and effective processing times.

In the pressure reduction type degassing method, the device for practicing the method is bulky and intricate. The cost of the equipment is expensive, except for the case where a small amount of liquid or water is batchwise processed.

The ultrasonic type degassing method suffers from a drawback in that its capacity is insufficient for a tank having a large capacity and a liquid delivering line having a high flow rate.

SUMMARY OF THE INVENTION

Accordingly, an object of this invention is to provide a method of continuously degassing water, in which all of the above-described drawbacks accompanying a conventional method have been eliminated.

It is another object of this invention to provide a method of water degasification where energy can be used economically, and the water can be continuously degassed in a short time.

The foregoing objects and other objects of the invention has been achieved by providing a method of continuously degassing water, in which an in-line heater is used to continuously mix saturated steam into water supplied continuously, to heat the water and to accelerate the foaming of the vapor phase components melted in the water by cavitation caused by the mixing of the saturated steam. Thereafter the water is degassed automatically while being pooled in a degassing tank under the atmospheric pressure.

This invention will be described with reference to the accompanying drawings and the description of the preferred embodiment that follows.

BRIEF DESCRIPTION OF THE DRAWINGS

FIG. 1 is a schematic diagram showing one example of a device for practicing a method of continuously degassing water;

FIG. 2 is a sectional view showing the essential construction of an in-line heater 4 shown in FIG. 1; and FIG. 3 is a schematic diagram showing a conventional heating type degassing device employed in the comparison example.

DESCRIPTION OF THE PREFERRED EMBODIMENT

A method of continuously degassing water according to this invention will now be described with reference to one example of a device for practicing the method shown in FIGS. 1 and 2.

The term "water" as herein used is intended to mean various kinds of water, such as original water, distilled water, hard water, soft water, drinking water and industrial water if it finally does not contain components which may contaminate the inner walls of the various members of the above-described liquid delivering line or may react with a part of the above-described coating liquid to produce materials which may make it impossible to maintain the inside of the liquid delivering line clean. Furthermore, the term "water" includes hot water or cold water which can sufficiently serve as cleaning liquid or rinsing liquid depending on the temperature, flow rate, pressure, etc. thereof.

First, stop valves 1 and 2 are fully opened to introduce supplying water W and saturated steam S. Then, the flow rate of the water W is controlled to a predetermined value by means of an orifice 3.

The water W whose flow rate has been controlled to the predetermined value by the orifice 3 is at room temperature. The water W is continuously introduced through one inlet 4a of an in-line heater 4, which is compactly arranged as a part of the pipe line ad into a diffuser 12 formed in the in-line heater 4 (FIG. 2).

On the other hand, the saturated steam S is allowed to flow through an automatic flow rate control valve 5, and a filter 6 to the other inlet 4b of the in-line heater 4. The steam is further allowed to flow from the inlet 4b through an injection section 13, which is obtained by forming a number of through-holes in the wall of the diffuser 12, into the diffuser 12. As a result, the steam is mixed with the water W therein. While heating the water W, the steam S mixed with the water W is liquified and consequently the volume of the stream is abruptly reduced (to less than about 1/2500 of the original volume) and cavitation occurs in the water. As a result, this steam is considerably accelerated, to blow vapor phase components such as air or other gases melted in the water W.

The hot water HW obtained by mixing the water W and the steam S is introduced through the outlet 4c of the in-line heater 4 and a conduit pipe to the bottom of a degassing tank 7. The upper part of the degassing tank 7 is opened to the atmosphere, and partition members 8 are alternately arranged in the degassing tank 7 as shown in FIG. 1. Therefore, as the quantity of hot water is increased in the tank 7, the hot water is forcibly run up and down along the partition members. After the hot water fills the degassing tank 7, a part of the hot water is discharged through an over-flow pipe 9, so that the quantity of hot water pooled therein is constant at all times.

The hot water HW poured into the degassing tank 7 is mixed with the saturated steam S in the in-line heater 4, and therefore its temperature is abruptly increased from its normal temperature. As a result, the quantity of gaseous components melted therein is changed in proportion to the heating temperature. Hence, the gaseous components are caused to assume bubbles. Simultaneously, the foaming of the gaseous components melted in the hot water is considerably accelerated by the aforementioned cavitation, i.e., the local pressure reduction caused by the mixing of the saturated steam S, and therefore the rate of foaming is markedly increased. Accordingly, while the hot water is moved up and down along the partition members 8 in the tank 7, the bubbles reach the surface of the hot water and are therefore discharged into the atmosphere.

The temperature of the heated hot water HW is detected by a temperature detector 10 inserted into the conduit pipe connected to the outlet 4c of the in-line heater 4 at all times. The opening degree of the above-described automatic flow rate control valve 5 is automatically controlled to a suitable value by the control signal of a temperature control system (not shown) operating on the detection signal from the temperature detector 10, so that the temperature of the hot water is maintained constant at all times.

The set temperature of the hot water HW can be reduced to a value obtained by subtracting a temperature corresponding to the foaming acceleration effect by the cavitation from the set temperature only by the heating and degassing.

For instance, if the set temperature obtained solely by the heating and degassing is 100° C., then the set temperature in the method according to the invention may be sufficiently of the order of 60° C. Accordingly, the above-described cavitation effect corresponds to about 40° C. in heating temperature.

The flow rate of the hot water HW is not limited. For instance, if all of the pipes are of the order of one inch in inside diameter, and the effective capacity of the degassing tank 7 is at least 100 l, then degassing hot water (hereinafter referred to as "degassed hot water DW" when applicable) can be continuously obtained.

The degassed hot water DW is introduced through a conduit pipe connected to a portion of the degassing tank 7, which is near the bottom, to a three-way switching valve, or a cross valve 11, connected to liquid delivering lines $L_1$ and $L_2$ for the above-described coating liquid. Thereafter, upon application of a switching signal, the cross valve 11 is switched for providing a cleaning flow path and then the degassed hot water DW is allowed to flow through the cross valve 11 into the liquid delivering line $L_2$.

After the inside of the liquid delivering line $L_2$ has been cleaned by the degassed hot water DW, the opening degree of the liquid discharging outlet of a coating section connected to the end of the liquid delivering line $L_2$ is reduced so that the liquid delivering line $L_2$ is maintained filled with the degassed hot water DW and no gaseous components are mixed into the degassed hot water DW in the liquid delivering line $L_2$.

The degassed hot water DW in the liquid delivering line $L_2$ can be replaced by the coating liquid by operating (or switching) the cross valve 11 without mixing gaseous components thereinto. Thus, the above-described difficulty caused by the bubbles which are produced in the initial period of coating when the coating liquid is again delivered, can be eliminated.

The method of the invention can be freely applied to a procedure in which, after the liquid delivering line $L_2$ has been cleaned with a cleaning liquid instead of the above-described degassed hot water DW, the cleaning liquid and the gaseous components are discharged by the degassed hot water, or to a procedure in which the above-described cleaning procedure is not carried out, and merely the coating liquid is replaced by the degassed hot water DW.

In the case where it is required to reduce the temperature of the degassed hot water DW to lower than 60°, a cooling device such as a plate cooler (not shown) and a stock tank (not shown) may be provided downstream of the degassing tank 7, so that the degassed hot water DW is cooled and stored continuously. Then the degassed hot water DW thus treated is introduced to the cross valve 11.

The above-described method according to the invention has the following significant effects:

(1) The saturated steam S is mixed into the supplying water W in the in-line heater 4, so that the temperature of the water is instantaneously increased and simultaneously the pressure of the water W is instantaneously decreased. Therefore, the rates of foaming and degassing in the degassing tank can be remarkably increased.

(2) Because of the cavitation effect accompanying the mixing of the saturated steam S, the desired degassing can be accomplished even if the heating temperature is set to a relatively low value. Therefore, heating energy can be economically used.

(3) The device for heating and reducing the pressure is compactly provided in the pipe line as an in-line heater. Therefore, the entire arrangement of the device can be made simple, with reduced equipment costs.

In order to clarify the degassing effect of the method of the invention, an example and a comparison example will be described:

EXAMPLE

With the hot water HW being made by using the degassing device according to the method of the invention shown in FIG. 1, the number of bubbles included in the degassed hot water DW, which was continuously discharged from the degassing tank 7, was measured by using an ultrasonic bubble detecting device (according to Japanese Patent Application Laid-Open No. 142585/1977).

The pressure of the saturated steam was about 1.03 kg/cm$^2$ the temperature of the supplying water was at about 16° C., and the flow rate of the supplying water was 10 l/min. The temperature of the hot water HW was set to 50° C., 60° C. and 70° C., and the hot water HW was poured into the degassing tank having a capacity of 10 l.

The hot water HW was stored in the degassing tank for one minute, and thereafter one half of the hot water was over-flowed. The results of measurements of the number of bubbles are as indicated in the following Table:

TABLE

|  | Hot water temperature °C. | Number of bubbles measured ea/min |
|---|---|---|
| Example | 50 | 0 |
|  | 60 | 0 |
|  | 70 | 0 |
| Comparison example | 50 | 42 |
|  | 60 | 46 |
|  | 70 | 55 |

COMPARISON EXAMPLE

The number of bubbles from a hot water degassed by using a conventional heating type degassing device as shown in FIG. 3 was measured.

In this case, the conditions of manufacturing degassed hot water were the same as those of the example with the exception of one condition where the in-line heater 4 in the concrete example was replaced by a plate-type heater 14.

The number of bubbles measured was as indicated in the Table above.

Thus, it is confirmed that the method according to the invention has significant improved degassing effects when compared with a conventional heating type degassing method.

What is claimed is:

1. In a method of continuously degassing water in which vapor phase components melted in water are continuously degassed by heating and reducing the pressure of the water, the improvement comprising introducing water into a diffuser at one end thereof, mixing saturated steam into the water in said diffuser along portions between inlet and exhaust thereof to heat said water and accelerate foaming of said vapor phase components by cavitation created in the water by local drop in pressure and, pooling said water under atmospheric pressure to allow said water to degass.

2. The method of claim 1 wherein water is pooled in a degassing tank, further comprising the step of removing degassed water from the bottom of said tank into a conduit.

3. The method of claim 1 wherein said step of mixing takes place in an in-line heater and said step of mixing further comprises the steps of continuously introducing water to one inlet of said heater for flow in said diffuser therethrough, introducing steam to another inlet of said heater and mixing said steam and water by passage of steam through injection ports in said diffuser.

4. The method of claims 1 or 3 further comprising the steps of measuring the temperature of the heated water and controlling the introduction of steam into said heater to maintain constant heated water temperature.

5. The method of claim 2 wherein said step of removing degassed water occurs following a step of introducing cleaning liquid into said conduit.

6. The method of claim 2 wherein said step of removing degassed water occurs following a step of introducing a coating liquid into said conduit.

7. The method of claims 1, 2, or 3 further comprising the step of regulating the flow rate of water to be mixed with steam.

8. The method of claims 2, 5 or 6 further comprising the step of cooling said degassed water prior to introduction into said conduit.

* * * * *